US007527069B2

(12) United States Patent
Denike et al.

(10) Patent No.: US 7,527,069 B2
(45) Date of Patent: May 5, 2009

(54) ELECTROMAGNETIC SPLIT FLAPPER PRESSURE RELIEF VALVE

(75) Inventors: Stuart K. Denike, Phoenix, AZ (US); G. Stephen McGonigle, Gilbert, AZ (US); Robert D. Sleeper, Laveen, AZ (US); Craig T. Dorste, Phoenix, AZ (US); Don J. Atkins, Chandler, AZ (US); Joseph J. Jira, Laveen, AZ (US)

(73) Assignee: Honeywell International Inc., Morristown, NJ (US)

( * ) Notice: Subject to any disclaimer, the term of this patent is extended or adjusted under 35 U.S.C. 154(b) by 277 days.

(21) Appl. No.: 11/511,692

(22) Filed: Aug. 28, 2006

(65) Prior Publication Data

US 2008/0047610 A1 Feb. 28, 2008

(51) Int. Cl.
*G05D 16/20* (2006.01)

(52) U.S. Cl. ................ 137/487.5; 137/512.1; 137/527; 137/599.14; 137/601.14; 251/65; 251/129.01

(58) Field of Classification Search ............. 137/487.5, 137/527, 599, 512.1, 601.13, 601.14, 110, 137/599.14; 251/65, 129.01, 73
See application file for complete search history.

(56) References Cited

U.S. PATENT DOCUMENTS 1,501,412 A * 7/1924 Ingram .................... 137/487.5
2,057,889 A * 10/1936 Fagan ...................... 137/487.5
3,294,115 A 12/1966 Koenigsberg et al.
3,325,140 A * 6/1967 Kooistra ...................... 251/65
3,788,596 A 1/1974 Maeda
4,600,034 A 7/1986 Ko
4,657,040 A * 4/1987 Torres ........................ 137/110
5,098,062 A 3/1992 Lungu
5,113,901 A 5/1992 Young
5,144,974 A 9/1992 Gaudin
5,209,454 A 5/1993 Engdahl et al.
5,368,013 A * 11/1994 Herweyer .................... 251/65
6,282,730 B1 9/2001 Duncan
6,325,354 B1 * 12/2001 Hoen et al. ................... 251/65
6,517,045 B1 2/2003 Northedge

* cited by examiner

*Primary Examiner*—Stephen M Hepperle
(74) *Attorney, Agent, or Firm*—Ingrassia Fisher & Lorenz, P.C.

(57) ABSTRACT

A pressure relief check valve system includes a valve body, a flapper, a magnet, an electromagnet, and a pressure sensor circuit. The flapper is rotationally mounted on the valve body and is movable between a closed position and an open position. The magnet is coupled to the flapper, and the electromagnet is coupled to the valve body. The pressure sensor circuit is adapted to sense one or more fluid pressures and is operable, based on the one or more sensed fluid pressures, to selectively supply or interrupt the electrical current to the electromagnet. The electromagnet is coupled to receive the electrical current and, upon receipt of the electrical current, either magnetically attracts or does not magnetically attract the magnet, to thereby hold the flapper in the closed position or allow flapper rotation to the open position, respectively.

20 Claims, 4 Drawing Sheets

602
602
204
204
224
224
604
604

202
224
606
602
204
204
602
606
224
612
614
608
604
608
614
612
604

ELECTROMAGNETIC SPLIT FLAPPER PRESSURE RELIEF VALVE

TECHNICAL FIELD

The present invention relates generally to a pressure relief valve and, more particularly, to an electromagnetically controlled pressure relief check valve.

BACKGROUND

Pressure relief valves are used in myriad systems and, as is generally known, are used to selectively relieve fluid pressure in a system or component of a system, if the fluid pressure therein attains a predetermined pressure value. One particular system that may include one or more pressure relief valves is an aircraft environmental control system (ECS). Aircraft ECSs typically include relatively low-pressure distribution ducts and, as such, may additionally include high-flow pressure relief and reverse flow pressure protection devices.

In order to provide the desired relief and reverse flow protection functionalities, some ECSs include an electro-pneumatic relief valve. These valves, while generally safe, reliable, and robust, are in many instances relatively large, relatively heavy, relatively costly, and relatively difficult to package. Moreover, typical pneumatic relief valves, while also generally safe, reliable, and robust, are typically implemented with relatively large sense areas to meet desired relief and flow specifications, making these relatively large, costly, and difficult to package, as well.

Accordingly, there is a need for a device that provides adequate pressure relief and reverse flow protection that is relatively small, inexpensive, and easy to package, as compared to presently known devices. The present invention addresses at least this need.

BRIEF SUMMARY

The present invention provides relatively small, inexpensive, and easy to package pressure relief and reverse flow protection valve. In one embodiment, and by way of example only, a pressure relief check valve system includes a valve body, a flapper, a magnet, an electromagnet, and a pressure sensor circuit. The valve body has an upstream side, a downstream side, and a flow channel that extends between the upstream and downstream sides. The flapper is rotationally mounted on the valve body and is movable between a closed position, in which the flapper at least substantially seals the flow channel, and an open position, in which the flapper unseals the flow channel. The magnet is coupled to the flapper. The electromagnet is coupled to the valve body and is configured to selectively receive electrical current. The electromagnet is operable, upon receipt of the electrical current, to either magnetically attract or not magnetically attract the magnet, to thereby at least substantially inhibit flapper rotation from the closed position or allow flapper rotation to the open position, respectively. The pressure sensor circuit is adapted to sense fluid pressure and is operable, based on the sensed fluid pressure, to selectively supply or interrupt the electrical current to the electromagnet.

Other independent features and advantages of the pressure relief check valve and system will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background or the following detailed description. In this regard, although the invention is described herein as being implemented in an aircraft environmental control system, and more specifically as a filter bypass pressure relief valve, it will be appreciated that it could also be implemented in any one of numerous other locations in an aircraft environmental control system, and in any one of numerous other types of systems that direct the flow of various types of fluid, both within or apart from an aircraft.

Figure 1:
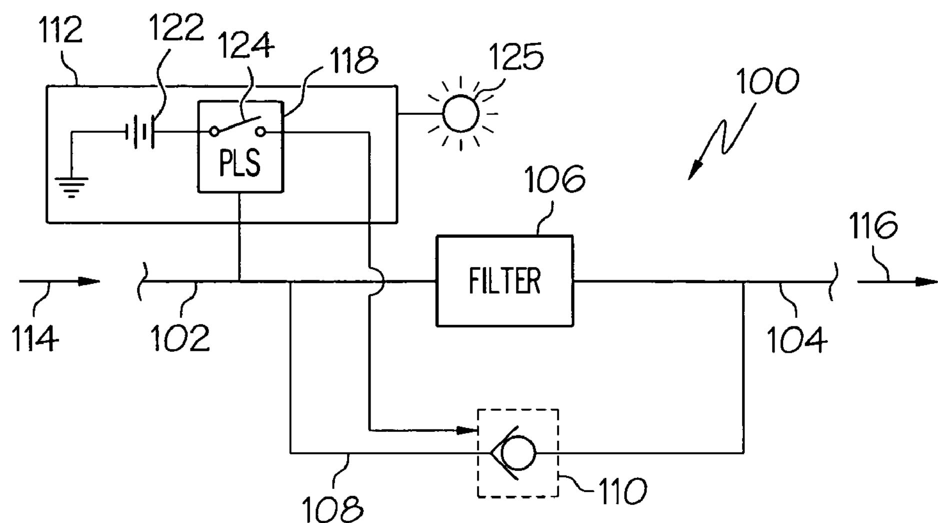
FIG. 1 is a simplified schematic diagram illustrating a portion of an aircraft environmental control system including a pressure relief check valve.

Turning now to FIG. 1, a simplified schematic diagram of a portion of an exemplary aircraft environmental control system 100 is depicted. The depicted portion of the environmental control system 100 includes an air inlet duct 102, an air outlet duct 104, a filter 106, filter bypass duct 108, a pressure relief valve 110, and a pressure sensor circuit 112. The air inlet duct 104 receives air from a conditioned air source 114, such as, for example, an air cooling system that is supplied with engine bleed air (neither of which are illustrated). The air in the air supply duct 104 flows through the filter 106, and into the outlet duct 104, which discharges the filtered air to a non-illustrated aircraft cabin 116.

The pressure sensor circuit 112 is configured to sense air pressure in the air inlet duct 102 and, based on the sensed air pressure, to selectively supply or interrupt a flow of current to the pressure relief valve 110. More specifically, if the sensed air pressure in the air inlet duct 102 is below a predetermined pressure value, the pressure sensor circuit 112, depending on the configuration of the pressure relief valve 110, will either supply or interrupt current flow to the pressure relief valve 110. Conversely, if the sensed air pressure reaches or exceeds the predetermined pressure value, the pressure sensor circuit 112, again depending on the configuration of the pressure relief valve 110, will either interrupt current flow or supply current flow to the pressure relief valve 110. It will be appreciated that the pressure sensor circuit 112 could alternatively be configured to sense various air pressures in the system 100, not just in the air inlet duct 102. For example, the pressure sensor circuit 112 could be configured to sense air pressure in the air outlet duct 104, the differential pressure across the filter 106, air pressure in one or more other non-illustrated system ducts, or differential pressure across (or between) one or more other non-illustrated system components.

It will additionally be appreciated that the pressure sensor circuit 112 may be implemented in using any one of numerous types of sensing devices and/or circuits. In the depicted embodiment, however, the pressure sensor circuit 112 is implemented using a pressure switch 118 and a power source 122. The pressure switch 118 is in fluid communication with the air inlet duct 102, and is electrically coupled between the power source and the pressure relief valve 110. The pressure switch 118 is configured to sense the air pressure in the air inlet duct 102 and, depending on the configuration of the pressure relief valve 110, either opens or closes a switch 124, to thereby electrically couple the power supply 122 to, or electrically uncouple the power supply 122 from, the pressure relief valve 110. As FIG. 1 additionally depicts, the pressure sensor circuit 112 may further include an annunciator 125 that is selectively energized whenever the pressure relief valve 110 is moved to an open position.

Figure 8:
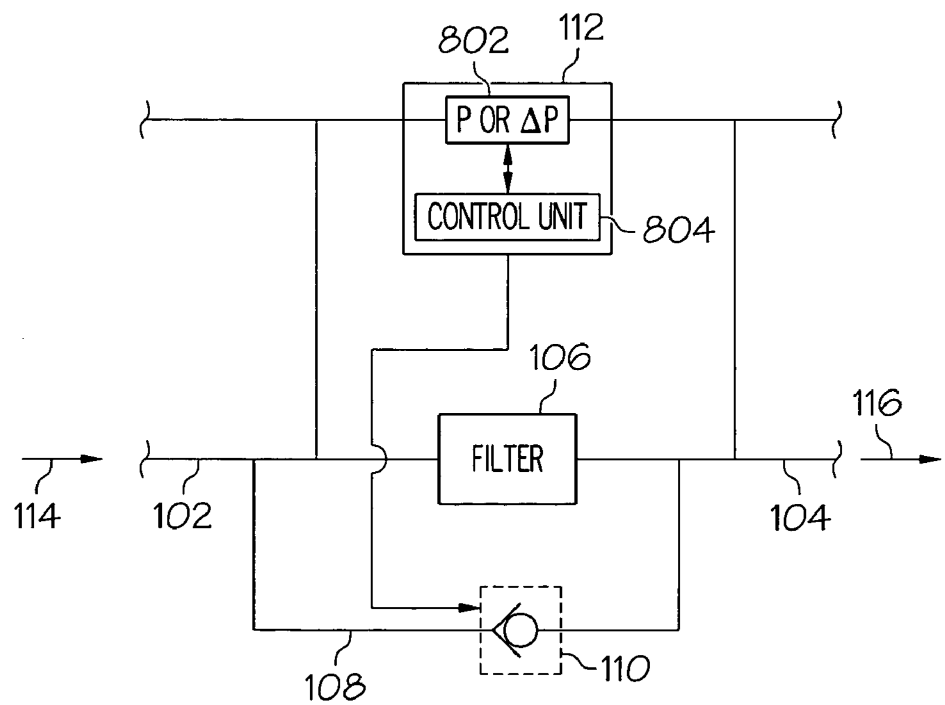
FIG. 8 is a simplified schematic diagram, similar to that of FIG. 1, illustrating a portion of an aircraft environmental control system including a pressure relief check valve and alternate configurations thereof.

It will be appreciated that the pressure sensor circuit 112 described above and depicted in FIG. 1 is merely exemplary of a particular preferred embodiment, and could be alternately configured. Exemplary alternative embodiments are depicted in simplified schematic form in FIG. 8. In such alternative embodiments the pressure sensor circuit 112 could be implemented as either a pressure sensor or as a differential pressure sensor 802 to sense air pressure or differential air pressure, respectively. The sensor 802, whether it be a pressure sensor or differential pressure sensor, may supply a signal representative of the sensed parameter to, for example, a control unit 804. The control unit 804, based on the sensed pressure or differential pressure, will in turn selectively supply or interrupt a flow of current to the pressure relief valve 110. It will be appreciated that the control unit 804 may be implemented as an analog device, a digital device, or combination thereof. As was alluded to above, the sensor 802 could be configured to sense air pressure in the inlet duct 102, the outlet duct 104, or one or more other non-illustrated system ducts, or to sense differential air pressure between the inlet and outlet ducts 102, 104, or differential air pressure across (or between) one or more other non-illustrated system components.

The pressure relief valve 110 is mounted on the bypass duct 108 and is movable between a closed position, in which air flow through the bypass duct 108 is inhibited, and an open position, in which air flow through the bypass duct 108, and around the filter 106, is allowed. The pressure relief valve 110 is electrically coupled to the pressure sensor circuit 112 and is configured, in response to the selective supply or interruption of current supplied therefrom to be selectively held in the closed position or move to the open position. During normal operation of the system 100, when the pressure sensor circuit 112 determines that the pressure in the air inlet duct 102 is below the predetermined pressure value, the pressure relief valve 100 is held in the closed position, and flow through the bypass duct 108 is prohibited (or at least substantially inhibited). If, however, the pressure sensor circuit 112 determines that the pressure in the air inlet duct 102 is at or above the predetermined pressure value, the pressure relief valve 110 is allowed to move to the open position, allowing air flow through the bypass duct 108. It is noted that a likely cause for such a pressure increase is that the filter 106 is clogged or otherwise obstructing air flow between the air inlet duct 102 and the air outlet duct 104.

The pressure relief valve 110 is preferably configured to exhibit a minimal pressure drop, and is additionally configured to prohibit reverse air flow from the air outlet duct 104 to the air inlet duct 102. In a particular preferred embodiment, the pressure relief valve 110 is implemented using a check valve. An exemplary embodiment of the pressure relief valve 110 is depicted in FIGS. 2-7, and will now be described in more detail.

Turning first to FIGS. 2-5, perspective, side, upstream end, and downstream end views, respectively, of the pressure relief valve 110 are depicted. The valve 110 includes a valve body 202 and a pair of flappers 204. The valve body 202 is annular in shape and includes an upstream side 206, a downstream side 208, and a pair of flow channels 212 that extend between the upstream and downstream sides 206, 208. An electrical connector 215 is coupled to the valve body 202, and is used to electrically couple the pressure relief valve 110 to the pressure sensor circuit 112 via, for example, a non-illustrated cable. The valve body 202 also includes a pair of support flanges 214 that extend axially from the valve body downstream side 206. A hinge pin 216 and a stop tube 218 are both coupled to, and extend between, the support flanges 214. The purpose of these components is described further below.

Figure 2:
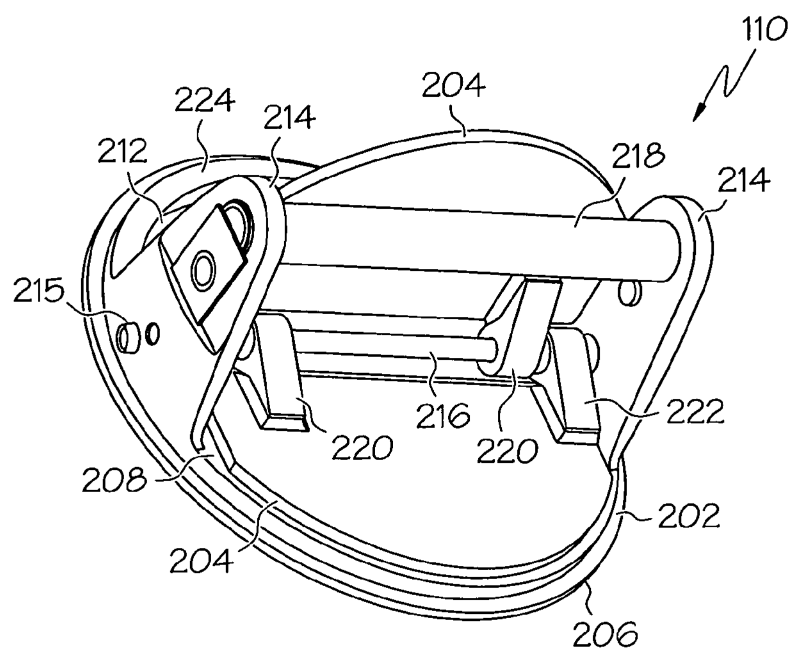
FIGS. 2-5 are perspective, side, upstream end, and downstream end views, respectively, of an exemplary embodiment of a pressure relief check valve that may be used in the system of FIG. 1.
Figure 3:
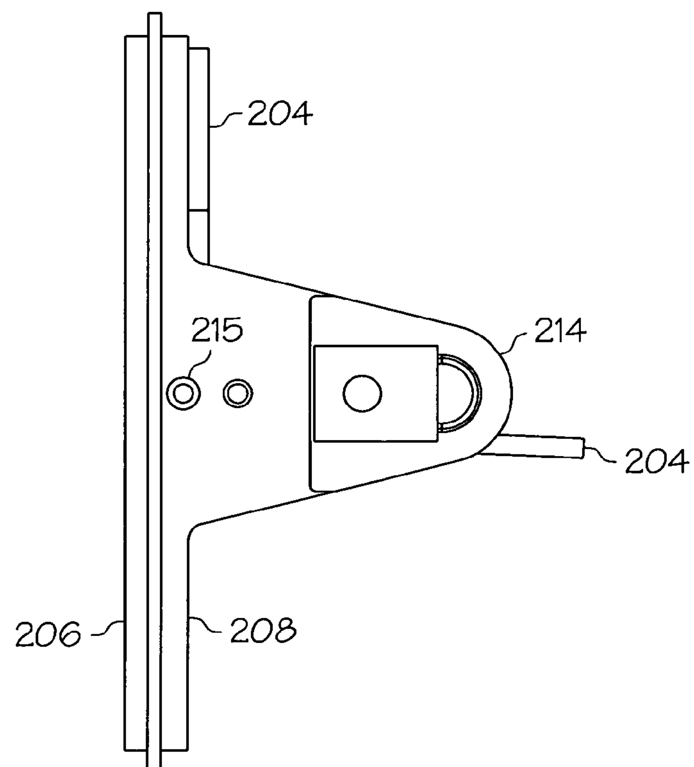
Figure 4:
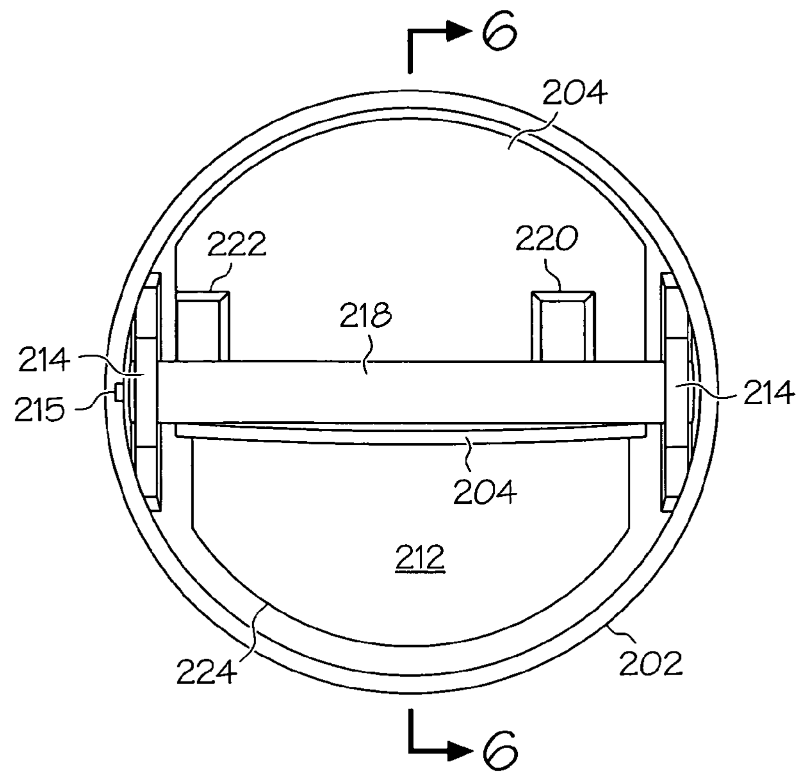
Figure 5:
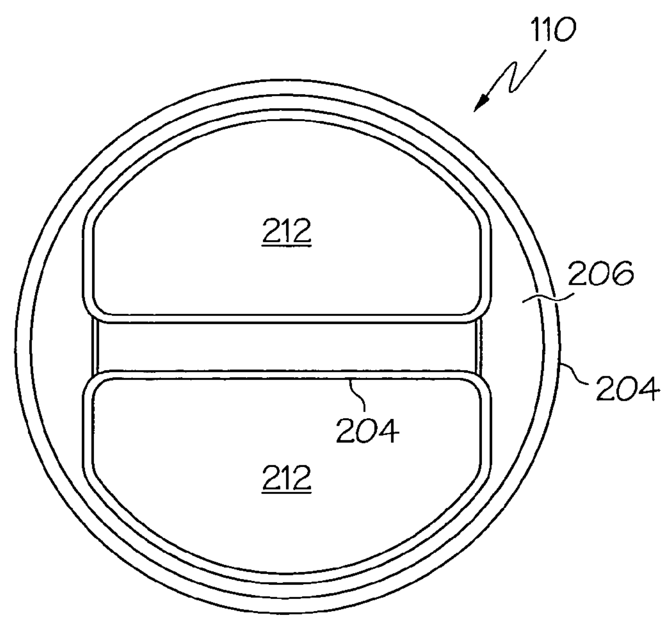

The flappers 204 are rotationally mounted on the valve body 202, and are movable between a closed position and a full-open position. In the depicted embodiment, this is accomplished by rotationally mounting each flapper 204 onto the hinge pin 208 via integral lugs 220, 222. No matter the specific manner in which the flappers 204 are rotationally mounted, in the closed position, the flappers 204 engage a seat region 224 (see FIGS. 2 and 4) on the valve body 202 to seal, or at least substantially seal, a corresponding flow channel 212. In the full-open position, or any one of numerous open positions between the closed and full-open positions, the flappers 204 unseal the corresponding flow channel 212. Thus, when the flappers 204 are in the closed position, fluid flow through the flow channels 212 is prevented, or at least substantially inhibited, and when the flappers 204 are in an open position, fluid flow through the flow channels 212 is allowed. As FIGS. 2-4 depict, flapper 204 rotational movement is limited by the stop tube 218.

Before proceeding further it is noted that although the valve 110 is depicted in FIGS. 2-5 with one of the flappers 204 in the closed position and the other flapper 204 in the open position, this is merely done so for the sake of illustration. In particular, the valve 110 is preferably configured such that both flappers 204 are simultaneously in either the closed or an open position. However, as will also be described further below, this is merely exemplary of a particular embodiment, and the valve 110 could be configured such that each flapper 204 may be individually moved to an open position. Moreover, although the valve 110 is preferably implemented with a pair of flow channels 212 and an associated pair of flappers 204, it will be appreciated that the valve 110 could, in an alternative embodiment, be implemented with more or less than this number of flow channels 212 and flappers 204.

Figure 7:
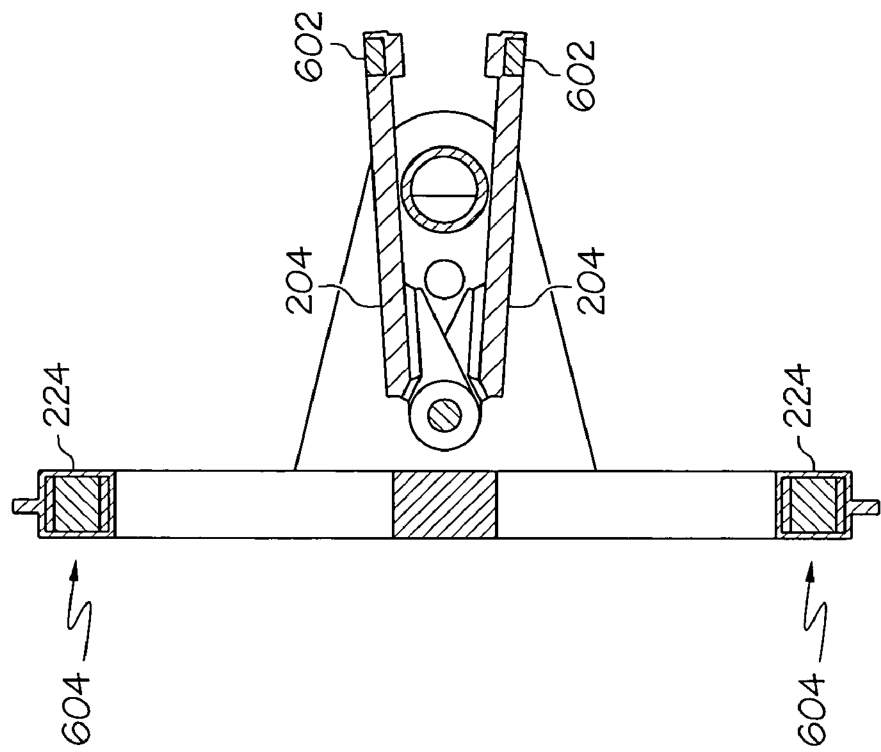
FIGS. 6 and 7 are cross section views of the pressure relief check valve depicted in FIGS. 2-5 taken along line 6-6 in FIG. 4, with the valve in the closed and full-open position, respectively.
Figure 6:
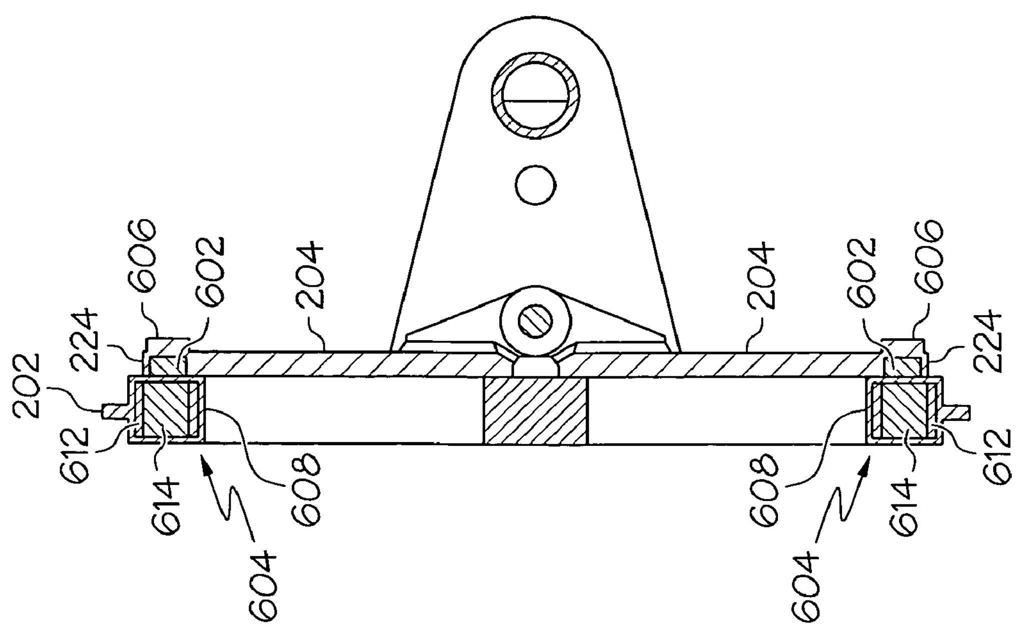

Returning now to the description, and with reference now to FIGS. 6 and 7, it is seen that the valve 110 additionally includes a pair of magnets 602, and a pair of electromagnets 604. The magnets 602 are coupled, one each, to the flappers 204, and the electromagnets 604 are coupled to the valve body 202. The magnets 602 may be coupled to the flappers 204 using any one of numerous suitable techniques, and disposed at any one of numerous locations. For example, in the depicted embodiment each magnet 602 is disposed within a groove 606 formed in each of the flappers 204, and is disposed at a location coincident with the section of the flapper 204 that engages the valve body seat region 224 when the flappers 204 are in the closed position. As FIG. 6 depicts, this location is also preferably coincident with the location of the electromagnets 604. It will be appreciated that the magnets 602 could be coupled within the grooves 606 using an appropriate adhesive or suitable fastener, or encapsulated therein with a suitable capping plate. It will be additionally be appreciated that the magnets 602 could alternatively be molded into each flapper 204 if the flappers 204 are formed of a composite material, or other suitably moldable material. Moreover, it will be appreciated that the magnets 602 may be formed of any one of numerous suitable magnetized materials.

The electromagnets 604 may similarly be coupled to the valve body 202 using any one of numerous suitable techniques, and be disposed at any one of numerous locations. In the depicted embodiment, however, each electromagnet 604 is embedded in a groove 608 formed in the valve body seat region 224. Thus, as noted above, when the flappers 204 are in the closed position each of the electromagnets 604 is preferably aligned with, or at least substantially aligned with, at least a portion of one of the magnets 602. Similar to the magnets 602, the electromagnets 604 may be coupled within the grooves 608 using an appropriate adhesive or suitable fastener, or encapsulated therein with a suitable capping plate. It will be additionally be appreciated that the electromagnets 604 could alternatively be molded into the valve body seat regions 224 if the valve body 202 is formed of a composite material, or other suitably moldable material.

The electromagnets 604, as is generally known, each include a coil 612 wound around a core 614. The coils 612 are each electrically coupled to the previously-mentioned electrical connector 215 via wires 502 that extend through grooves or channels formed in, or coupled to, the valve body 202. The wires 502 are depicted in phantom in FIG. 5, in accordance with one exemplary routing scheme. The electrical connector 215 is in turn electrically coupled, as also previously mentioned, to the pressure sensor circuit 112. Depending upon how the pressure relief valve 110 is to be configured, the cores 614 may be permanently magnetized, or become suitably magnetized when current flows through the coil 612. If the cores 614 are permanently magnetized, then each core 614 is disposed within the valve body 202 such that it will attract the magnet 602 in the corresponding flapper 204. As a result, the flappers 204 will be at least urged, via the magnetic force between the two magnets 602, 614, toward the closed position. In addition, the coils 612 will be electrically coupled such that, upon receipt of electrical current, each will generate a magnetic field that opposes that of its associated core 614. As a result, the magnets 602 will no longer be attracted by the cores 614, and the flappers 204 will be free to move, in response to a suitable fluid differential pressure, to an open position. It will be appreciated that, in some embodiments, the electromagnets 604 could be supplied with electrical current of a sufficient magnitude to generate a magnetic field of sufficient strength to repel the magnets 602, and actually urge the flappers 204 toward an open position. It will additionally be appreciated that in some embodiments the electromagnets 604 could be implemented without the cores 614, and be comprised of just the coils 612.

If the cores 614 of each electromagnet 604 are not permanently magnetized, then the electromagnets 604 will generate a suitable magnetic field that attracts its corresponding magnet 602 only when its coil 612 is energized with electrical current. In such embodiments, as long as it is desired to at least urge the flappers 204 into closed positions, the electromagnets 604 will be suitably energized with electrical current to generate a magnetic field that attracts its corresponding magnet 602. When it is no longer desired to urge the flappers 204 into closed positions, electrical current to the electromagnets 604 is interrupted. As a result, the electromagnets 604 no longer generate a magnetic field, or at least one of suitable strength, that attracts the magnets 602, and the flappers 204 will be free to move, in response to a suitable fluid differential pressure, to an open position. It will be appreciated that, in some embodiments, rather than interrupting electrical current to the electromagnets 604, the electromagnets 604 could be supplied with electrical current of a sufficient magnitude and polarity to generate a magnetic field of sufficient strength to repel the magnets 602, and actually urge the flappers 204 toward an open position.

Having generally described a particular system 100 in which the pressure relief valve 110 may be installed, and more specifically described particular embodiments of the pressure relief valve 110, a more detailed description of the operation of the particular pressure relief valve 110 embodiments in the particular system 100 will now be described. In doing so, reference should be made, as needed, to FIGS. 1, 6 and 7.

Turning first to FIGS. 1 and 6, during normal operation of the system 100, the pressure in the air inlet duct 102, as sensed by the pressure sensor circuit 112, is below the predetermined pressure value. As a result, and as depicted in FIG. 6, the relief valve 110 is in its closed position, and is being at least urged toward the closed position by the magnetic force between the magnets 602 and the electromagnets 604. Thus, air directed into the air inlet duct 102 is prohibited from flowing through the bypass duct 108, and is instead directed through the filter 106, and into and through the air outlet duct 104.

Before proceeding further, it is noted that during the above-described normal system operation, the pressure sensor circuit 112 may be configured to either supply or interrupt current flow to the electromagnets 604. As noted above, this depends upon the desired configuration of the system 100 and, concomitantly, the electromagnets 604. If it is desired to maintain the electromagnets 604 deenergized during normal system operation, then the electromagnets 604 will be configured, as described above, to generate a suitable magnetic field that attracts the flapper magnets 602 when electrical current to the electromagnets 604 is interrupted. Alternatively, if it is desired to keep the electromagnets 604 energized during normal system operation, then the electromagnets 604 will be configured, as also described above, to generate a suitable magnetic field that attracts the flapper magnets 602 when current flow is appropriately supplied to the electromagnets 604.

Turning now to FIGS. 1 and 7, if, during system operation, the pressure in the air inlet duct 102, as sensed by the pressure sensor circuit 112, reaches or exceeds the predetermined pressure value, the pressure sensor circuit 112 will either supply or interrupt current to the electromagnets 604. If the electromagnets 604 are configured to generate a suitable magnetic field that attracts the flapper magnets 602 when electrical current to the electromagnets 604 is interrupted, then the pressure sensor circuit 112 will supply current to the electromagnets 604. The current supplied to the electromagnets 604 will be of a magnitude and polarity to generate a magnetic field that opposes the non-energized magnetic field sufficiently to allow fluid pressure in the air inlet duct 102 to move the flappers 204 to the full-open position. As was alluded to above, the pressure sensor circuit 112 could alternatively be configured to supply current to the electromagnets 604 of a sufficient magnitude and polarity to generate a magnetic field that not only opposes the non-energized magnetic field, but is of a sufficient strength to cause a repulsive force between the electromagnets 604 and the flapper magnets 602. If, alternatively, the electromagnets 604 are configured to generate a suitable magnetic field that attracts the flapper magnets 204 only when electrical current is supplied to the electromagnets 604, then the pressure sensor circuit 112 will interrupt current to the electromagnets 604. As a result, the electromagnets 604 will no longer attract the flapper magnets 602, and fluid pressure in the air inlet duct 102 can move the flappers to the full-open position. In both instances, when the pressure relief valve 110 is moved to the full-open position, air flows through the bypass duct 108, and into the air outlet duct 104.

It is noted that in the preceding description, the electromagnets 604, and more specifically the electromagnetic coils 612, are electrically coupled in parallel, and thus will both be simultaneously energized and deenergized. It will be appreciated that this is merely exemplary, and that the electromagnetic coils 612 could be electrically coupled in series to implement this same functionality. Moreover, in yet another alternative embodiment, the electromagnetic coils 612 could be separately coupled to the pressure sensor circuit 112, and the pressure sensor circuit 112 could be configured to separately supply and interrupt current to each of the electromagnets 604. In this latter embodiment, it will additionally be appreciated that the sensor circuit 112 could be configured to supply and interrupt current to each of the electromagnets 604 at different pressure values in the air inlet duct 102. For example, if air pressure in the air inlet duct 102 reaches a first pressure value, the pressure sensor circuit 112 could be configured to supply or interrupt current (as appropriate) to one of the electromagnets 604, while interrupting or supplying (as appropriate) current to the other electromagnet 604. As a result, only one of the flappers 204 would be moved to its full-open position, while the other remained in its closed position. Thereafter, if pressure in the air inlet duct 102 reached a second, higher pressure magnitude, the pressure sensor circuit 112 could be configured to supply or interrupt current (as appropriate) to the electromagnet 604 associated with the closed flapper 204, causing it to be moved to its full-open position.

It may be appreciated from the previous description that the force urging the flappers 204 to the full-open position is equal to the air pressure in the air inlet duct 102 (e.g., $P_1$) times the area of flappers 204 exposed to this air pressure. Moreover, there is a pneumatic force urging the flappers 204 to the closed position that is equal to the air pressure in the air outlet duct 104 (e.g., $P_2$) times the area of flappers exposed to this air pressure. In the closed position, the area of each flapper 204 exposed to air pressure in the air inlet duct 102 is the cross sectional flow area of each flow channel 214. As the air pressure in the air inlet duct 104 increases due, for example, to a clogged or obstructed air filter 106, the differential pressure across the flappers 204 increases, and the force urging the flappers 204 toward the open position concomitantly increases. Thus, the electromagnets 604, and the current supplied to the electromagnets 604 from the pressure sensor circuit 112 (if the electromagnets 604 are so configured) should generate a magnetic force sufficient to keep the flappers 204 in the closed position until a desired air pressure value is sensed in the air inlet duct 102.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A pressure relief check valve system, comprising:

a valve body having an upstream side, a downstream side, and a flow channel that extends between the upstream and downstream sides;

a flapper rotationally mounted on the valve body and movable between a closed position, in which the flapper at least substantially seals the flow channel, and an open position, in which the flapper unseals the flow channel;

a magnet disposed within and movable with the flapper;

an electromagnet disposed within the valve body and configured to selectively receive electrical current, the electromagnet operable, upon receipt of the electrical current, to either magnetically attract or not magnetically attract the magnet, to thereby at least substantially inhibit flapper rotation from the closed position or allow flapper rotation to the open position, respectively; and a pressure sensor circuit configured to sense at least a fluid pressure on the upstream side of the valve body and operable, based on the sensed fluid pressure, to selectively supply or interrupt the electrical current to the electromagnet.

2. The system of claim 1, wherein the pressure sensor circuit is configured to supply the electrical current to the electromagnet and, if the sensed fluid pressure is equal to or greater than a predetermined value, to interrupt the electrical current to the electromagnet.

3. The system of claim 2, wherein the electromagnet is configured, upon receipt of the electrical current, to generate a magnetic field that attracts the magnet, and thereby generates a magnetic force that at least urges the flapper toward the closed position.

4. The system of claim 1, wherein the pressure sensor circuit is configured to interrupt the electrical current to the electromagnet and, if the sensed fluid pressure is equal to or greater than a predetermined value, to supply the electrical current to the electromagnet.

5. The system of claim 4, wherein the electromagnet is configured to generate a magnetic field that attracts the magnet when the electrical current is interrupted, to thereby urge the flapper toward the closed position, and to generate a magnetic field that does not attract the magnet when the electrical current is supplied thereto, to thereby allow upstream fluid pressure to at least urge the flapper toward the open position.

6. The system of claim 1, wherein the pressure sensor circuit comprises a pressure switch configured to sense the fluid pressure and, based on the sensed fluid pressure, to selectively move a switch between an open and a closed position.

7. The system of claim 6, wherein the pressure switch is configured to move the switch to (i) the open position when the sensed fluid pressure is greater than or equal to a predetermined pressure value and (ii) the closed position when the sensed fluid pressure is less than the predetermined pressure value.

8. The system of claim 6, wherein the pressure switch is configured to move the switch to (i) the closed position when the sensed fluid pressure is greater than or equal to a predetermined pressure value and (ii) the open position when the sensed fluid pressure is less than the predetermined pressure value.

9. The system of claim 1, wherein the pressure sensor circuit comprises:

a sensor configured to sense at least the fluid pressure on the upstream side of the valve body and supply a signal representative thereof; and a control unit coupled to receive the signal from the sensor and operable, in response thereto, to selectively supply or interrupt the electrical current to the electromagnet.

10. The system of claim 9, wherein the control unit is configured to (i) interrupt the electrical current to the electromagnet when at least the fluid pressure on the upstream side of the valve body is greater than or equal to a predetermined pressure and (ii) supply the electrical current to the electromagnet when at least the fluid pressure on the upstream side of the valve body is less than the predetermined pressure.

11. The system of claim 9, wherein the control unit is configured to (i) supply the electrical current to the electromagnet when at least the fluid pressure on the upstream side of the valve body is greater than or equal to a predetermined pressure and (ii) interrupt the electrical current to the electromagnet when at least the fluid pressure on the up stream side of the valve body is less than the predetermined pressure.

12. The system of claim 1, further comprising:

a power source configured to supply the electrical current.

13. The system of claim 1, wherein the valve body further comprises:

a second flow channel that extends between the upstream and downstream sides;

a second flapper rotationally mounted on the valve body and movable between a closed position, in which the second flapper at least substantially seals the second flow channel, and an open position, in which the second flapper unseals the flow channel;

a second magnet coupled to the second flapper;

a second electromagnet coupled to the valve body and configured to selectively receive electrical current, the second electromagnet operable, upon receipt of the electrical current, to either magnetically attract or not magnetically attract the second magnet, to thereby at least substantially inhibit second flapper rotation from the closed position or allow second flapper rotation to the open position, respectively.

14. The system of claim 13, wherein electrical current is simultaneously supplied or interrupted to the first and second electromagnets.

15. The system of claim 13, wherein the pressure sensor circuit is operable to selectively supply or interrupt electrical current to the first electromagnet, if at least the fluid pressure on the upstream side of the valve body is at or above a first value, and to selectively supply or interrupt electrical current to the second electromagnet, if at least the fluid pressure on the upstream side of the valve body is at or above a second value that differs from the first value.

16. A pressure relief check valve system, comprising:

a valve body having an upstream side, a downstream side, and a plurality of flow channels that extend between the upstream and downstream sides;

a plurality of flappers rotationally mounted on the valve body, each flapper movable between a closed position, in which the flapper at least substantially seals one of the flow channels, and an open position, in the flapper unseals one of the flow channels;

a plurality of magnets, each magnet disposed within and movable with one of the flappers;

a plurality of electromagnets, each electromagnet disposed within the valve body and configured to selectively receive electrical current and operable, upon receipt of the electrical current, to either magnetically attract or not magnetically attract one of the magnets, to thereby at least substantially inhibit rotation of one of the flappers from the closed position or allow rotation of one of the flappers to the open position, respectively; and a pressure sensor circuit configured to sense at least a fluid pressure on the upstream side of the valve body and operable, based on the sensed fluid pressure, to selectively supply or interrupt the electrical current to the electromagnets.

17. The system of claim 16, wherein the pressure sensor circuit is configured to supply the electrical current to the electromagnets and, if at least the fluid pressure on the upstream side of the valve body is equal to or greater than a predetermined pressure, to interrupt the electrical current to the electromagnets.

18. The system of claim 17, wherein the electromagnets are each configured, upon receipt of the electrical current, to generate a magnetic field that attracts one of the magnets, and thereby generates a magnetic force that at least urges one of the flappers toward the closed position.

19. The system of claim 16, wherein the pressure sensor circuit is configured to interrupt electrical current to the electromagnets and, if at least the fluid pressure on the upstream side of the valve body is equal to or greater than a predetermined pressure, to supply the electrical current to the electromagnets.

20. The system of claim 19, wherein the electromagnets are each configured to generate a magnetic field that attracts one of the magnets when the electrical current is interrupted, to thereby at least urge one of the flappers toward the closed position, and to generate a magnetic field that does not attract one of the magnets when the electrical current is supplied thereto, to thereby allow upstream fluid pressure to at least urge one of the flappers toward the open position.

* * * * *